United States Patent
Stingu et al.

(10) Patent No.: US 12,068,631 B2
(45) Date of Patent: Aug. 20, 2024

(54) ALIGNMENT METHOD FOR SUB-SURFACE WIRELESS CHARGER

(71) Applicant: Spark Connected LLC, Dallas, TX (US)

(72) Inventors: Petru Emanuel Stingu, Dallas, TX (US); Kenneth Moore, Dallas, TX (US); Yulong Hou, Shanghai (CN); Ruwanga Dassanayake, Dallas, TX (US)

( * ) Notice: Subject to any disclaimer, the term of this patent is extended or adjusted under 35 U.S.C. 154(b) by 642 days.

(21) Appl. No.: 17/228,383

(22) Filed: Apr. 12, 2021

(65) Prior Publication Data

US 2021/0320516 A1 Oct. 14, 2021

Related U.S. Application Data

(60) Provisional application No. 63/009,242, filed on Apr. 13, 2020.

(51) Int. Cl.
*H02J 7/02* (2016.01)
*H02J 7/00* (2006.01)
*H02J 50/10* (2016.01)

(52) U.S. Cl.
CPC ............ *H02J 7/02* (2013.01); *H02J 7/0042* (2013.01); *H02J 50/10* (2016.02)

(58) Field of Classification Search
CPC ............ H02J 7/02; H02J 50/10; H02J 7/0042
USPC ........................................................ 307/104
See application file for complete search history.

(56) References Cited

U.S. PATENT DOCUMENTS

| | | | |
|---|---|---|---|
| 3,376,578 | A | 4/1968 | Sawyer |
| 3,735,231 | A | 5/1973 | Sawyer |
| 4,860,183 | A | 8/1989 | Maeda et al. |
| 5,434,504 | A | 7/1995 | Hollis et al. |
| 5,498,948 | A | 3/1996 | Bruni et al. |
| 6,175,169 | B1 | 1/2001 | Hollis, Jr. et al. |
| 6,184,651 | B1 | 2/2001 | Fernandez et al. |
| 6,445,093 | B1 | 9/2002 | Binnard |
| 6,803,744 | B1 | 10/2004 | Sabo |
| 6,949,845 | B2 | 9/2005 | Oisugi et al. |
| 8,049,370 | B2 | 11/2011 | Azancot et al. |
| 8,193,769 | B2 | 6/2012 | Azancot et al. |
| 8,957,549 | B2 | 2/2015 | Kesler et al. |
| 9,590,444 | B2 | 3/2017 | Walley et al. |
| 9,800,191 | B2 | 10/2017 | Barsilai et al. |
| 9,853,441 | B2 | 12/2017 | Teggatz et al. |
| 10,054,622 | B2 | 8/2018 | Hernandez et al. |

(Continued)

OTHER PUBLICATIONS

Consumer Reports, "Wireless charging pad review: We tested four popular pads to see whether they really make your life easier", Wireless Charging Pad Reviews, Dec. 11, 2013, 5 pages.

(Continued)

*Primary Examiner* — Alfonso Perez Borroto

(57) ABSTRACT

In an embodiment, a method includes: placing a template at a first surface of a structure; placing a first magnet at the first surface based on the template; placing a second magnet at a second surface of the structure at a first location in which a magnetic field between the first and second magnets moves the second magnet towards the first magnet; waiting for the second magnet to stop moving at a second location of the second surface; marking the second location; and attaching a sub-surface wireless charger based on a location of the template.

22 Claims, 7 Drawing Sheets

(56) References Cited

U.S. PATENT DOCUMENTS

| | | | |
|---|---|---|---|
| 10,079,090 B2 | 9/2018 | Teggatz et al. | |
| 10,168,443 B2 | 1/2019 | Mangano et al. | |
| 2006/0061323 A1 | 3/2006 | Cheng et al. | |
| 2010/0081377 A1* | 4/2010 | Chatterjee | G06F 1/1632 455/41.1 |
| 2010/0083012 A1* | 4/2010 | Corbridge | H04M 1/72409 713/300 |
| 2010/0146308 A1* | 6/2010 | Gioscia | H02J 50/90 307/104 |
| 2010/0181841 A1 | 7/2010 | Azancot et al. | |
| 2010/0219183 A1 | 9/2010 | Azancot et al. | |
| 2010/0244579 A1 | 9/2010 | Sogabe et al. | |
| 2011/0050164 A1 | 3/2011 | Partovi et al. | |
| 2011/0062793 A1 | 3/2011 | Azancot et al. | |
| 2011/0074344 A1 | 3/2011 | Park et al. | |
| 2011/0121660 A1 | 5/2011 | Azancot et al. | |
| 2011/0227527 A1 | 9/2011 | Zhu et al. | |
| 2012/0032632 A1 | 2/2012 | Soar | |
| 2012/0104999 A1* | 5/2012 | Teggatz | H02J 7/00034 336/200 |
| 2013/0049484 A1 | 2/2013 | Weissentem et al. | |
| 2013/0082651 A1 | 4/2013 | Park et al. | |
| 2013/0257172 A1 | 10/2013 | Teggatz et al. | |
| 2013/0264973 A1 | 10/2013 | Garg et al. | |
| 2013/0285601 A1 | 10/2013 | Sookprasong et al. | |
| 2013/0300204 A1 | 11/2013 | Partovi | |
| 2014/0080409 A1 | 3/2014 | Frankland et al. | |
| 2014/0184150 A1 | 7/2014 | Walley | |
| 2015/0115877 A1 | 4/2015 | Arai et al. | |
| 2015/0142348 A1 | 5/2015 | Huang et al. | |
| 2015/0249484 A1 | 9/2015 | Mach et al. | |
| 2015/0341087 A1 | 11/2015 | Moore et al. | |
| 2016/0149440 A1 | 5/2016 | Staring et al. | |
| 2017/0163100 A1 | 6/2017 | Vocke et al. | |
| 2019/0109498 A1 | 4/2019 | Stingu et al. | |
| 2019/0190320 A1 | 6/2019 | Park | |
| 2019/0319494 A1 | 10/2019 | Park et al. | |
| 2019/0334388 A1 | 10/2019 | Van Wageningen et al. | |

OTHER PUBLICATIONS

Digi-Key Electronics, "Inductive Versus Resonant Wireless Charging: A Truce May Be a Designer's Best Choice", Contributed By Digi-Key's North American Editors, Aug. 2, 2016, 8 pages.

Gao, Xiang, "Demodulating Communication Signals of Qi-Compliant Low-Power Wireless Charger Using MC56F8006 DSC", NXP Freescale Semiconductor Application Note, Document No. AN4701, Rev. 0, Mar. 2013, 21 pages.

Jansen, J. W., et al., "Overview of analytical models for the design of linear and planar motors", TU/e Eindhoven University of Technology, DOI: 10.1109/TMAG/2014.2328556, Jan. 1, 2014, 8 pages.

Johns, Bill et al., "Adapting Qi-compliant wireless-power solutions to low-power wearable products", Texas Instruments, High-Performance Analog Products, 2Q, 2014, Analog Applications Journal, 7 pages.

Kot, Thomas, "LC Sensor Rotation Detection with MSP430™ Extended Scan Interface (ESI)", Texas Instruments, Application Report, SLAA639, Jul. 2014, 33 pages.

Lynch, Brian T., "Under the Hood of a DC/DC Boost Converter", Texas Instruments, Texas Instruments, Power Supply Design Seminar, Paper SEM1800, Dallas, TX, USA, 2008-2009, 26 pages.

Rice, John, "Examining Wireless Power Transfer", Texas Instruments, 2014/2015 Power Supply Design Seminar, 38 pages.

Texas Instruments, "Industry-Leading Wireless Power Solutions The Most Widely Adopted in the Market", ti.com/wirelesspower, SLYT485C, 2013, 3 pages.

Texas Instruments, "Introduction to Wireless Power", QI WPC 1.1 compliant, 49 pages.

Waters, Benjamin et al., "Optimal Coil Size Ratios for Wireless Power Transfer Applications", IEEE, Jul. 28, 2014, 4 pages.

Wikipedia, "Electromagnetic coil", https://en.wikipedia.org/w/index.php?title=Electromagnetic_coil&oldid=776415501, Apr. 20, 2017, 6 pages.

Wikipedia, "Inductive charging", https://en.wikipedia.org/w/index.php?title=Inductive_charging&oldid=802615270, Sep. 27, 2017, 7 pages.

Wikipedia, "Qi (standard)", https://en.wikipedia.org/w/index.php?title=Qi_(standard)&oldid=803427516, Oct. 2, 2017, 5 pages.

Zens, "Zens First Worldwide to Introduce Built-in Wireless (Sub-)Surface Charger with Apple and Samsung Fast Charge", Mar. 23, 2018, 5 pages.

* cited by examiner

PRIOR ART cross-section view cross-section view cross-section view perspective view

ALIGNMENT METHOD FOR SUB-SURFACE WIRELESS CHARGER

CROSS-REFERENCE TO RELATED APPLICATIONS

This application claims the benefit of U.S. Provisional Application No. 63/009,242, filed on Apr. 13, 2020, which application is hereby incorporated herein by reference.

TECHNICAL FIELD

The present disclosure relates generally to an electronic system and method, and, in particular embodiments, to an alignment method for sub-surface wireless charger.

BACKGROUND

Wireless charging systems are becoming ubiquitous in today's society. For example, many smartphones and wearables implement wireless charging technology. Ease of use, greater reliability, spatial freedom, reduced connectors and openings, and the possibility of hermetically sealing are among the benefits offered by wireless charging. Wireless charging standards allow for interoperability between different devices and manufacturers. Some wireless charging standards, such as the Qi standard from the Wireless Power Consortium, and standards promoted by the AirFuel alliance, are becoming widely adopted. The Qi standard uses inductive charging operating between 80 kHz and 300 kHz to wirelessly transmit power from a transmitter to a receiver. Standards promoted by the AirFuel alliance use resonant wireless charging operating at 6.78 MHz to wirelessly transmit power from a transmitter to a receiver.

FIG. 1 shows exemplary wireless charging system 10. Wireless charging system 10 includes a transmitter (TX) device 12 (also referred to as wireless power transmitter) that includes a transmitting coil $L_{TX}$, and a receiver (RX) device 14 (also referred to as wireless power receiver) that includes a receiving coil $L_{RX}$. The efficiency of the wireless power transmission generally depends on the coupling between the coil $L_{TX}$ and coil $L_{RX}$. The coupling between the coil $L_{TX}$ and coil is generally based on the relative position between the coil $L_{TX}$ and coil $L_{RX}$.

SUMMARY

In accordance with an embodiment, a method includes: placing a template at a first surface of a structure; placing a first magnet at the first surface based on the template; placing a second magnet at a second surface of the structure at a first location in which a magnetic field between the first and second magnets moves the second magnet towards the first magnet; waiting for the second magnet to stop moving at a second location of the second surface; marking the second location; and attaching a sub-surface wireless charger based on a location of the template.

In accordance with an embodiment, an assembly kit includes: a first magnet; a second magnet; a template; and a sub-surface wireless charger, where the assembly kit is to be assembled based on a method that includes placing the template at a first surface of a structure; placing the first magnet at the first surface based on the template; placing the second magnet at a second surface of the structure at a first location in which a magnetic field between the first and second magnets moves the second magnet towards the first magnet; waiting for the second magnet to stop moving at a second location of the second surface; marking the second location; and attaching the sub-surface wireless charger based on a location of the template.

In accordance with an embodiment, a method includes: placing a detachable template at a first surface of a structure; placing a first magnet at the first surface based on the detachable template; placing a second magnet at a second surface of the structure at a first location in which a magnetic field between the first and second magnets pushes the second magnet towards the first magnet; when the second magnet is at a resting position in a second location of the second surface, marking the second surface of the structure based on the second location; and attaching a sub-surface wireless charger to the detachable template.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a method for aligning a sub-surface wireless charger. Embodiments of the present invention may also be used to align other types of wireless chargers.

It is understood that the term wireless charging is not limited to the charging of a battery, but includes wireless power transmission generally, unless stated otherwise.

In an embodiment of the present invention, a template is placed in a first surface (e.g., the bottom surface) of a structure (e.g., a table) where a sub-surface wireless charger is to be attached. A first magnet is placed where the transmitting coil of the sub-surface wireless charger will be located. A second magnet is placed at a second surface of the structure (e.g., at the top of the table) where a receiver is to be placed to receive wireless power. The first magnet attracts the second magnet so that the second magnet moves to the location of the second surface where the magnetic field is maximized. A charging mark is placed at the location where the second magnet stopped moving. The sub-surface wireless charger is then attached to the first surface based on the template. After installation and during normal operation, a receiver is placed on top of the charging mark to receive wireless power from the sub-surface wireless charger.

Figure 1:
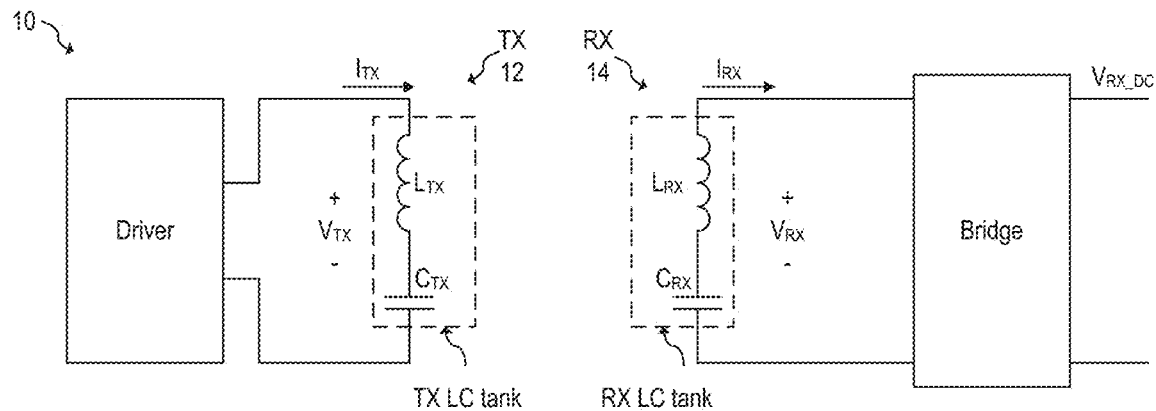
FIG. 1 shows an exemplary wireless charging system.
Figure 2:
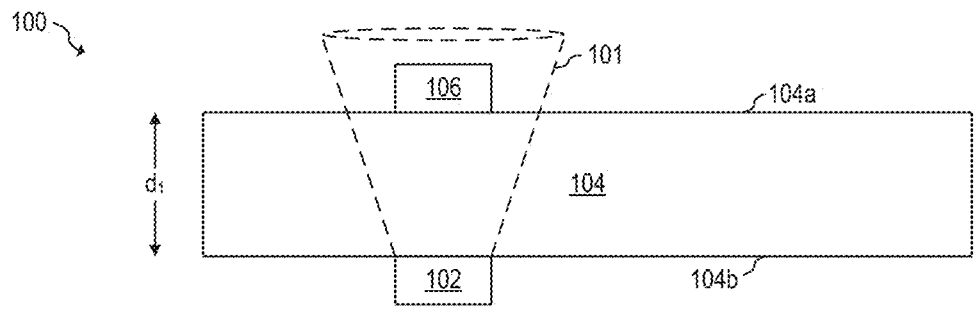
FIG. 2 shows a schematic diagram of a sub-surface wireless charging system, according to an embodiment of the present invention.

FIG. 2 shows a schematic diagram of sub-surface wireless charging system wo, according to an embodiment of the present invention. Sub-surface wireless charging system wo includes sub-surface wireless charger 102, structure 104, and receiver 106. Structure 104 includes top surface 104a, and bottom surface 104b. Sub-surface wireless charger 102 is attached (e.g., glued) to bottom surface 104b. Receiver 106 is disposed over top surface 104a, e.g., when receiver 106 is to receive wireless power from sub-surface wireless charger 102.

Figure 3:
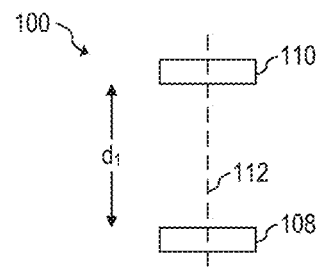
FIG. 3 shows a transmitting coil of sub-surface wireless charger of FIG. 2 and a receiving coil of the receiver of FIG. 2 having their respective coil centers aligned with a centerline, according to an embodiment of the present invention.

During normal operation, sub-surface wireless charger 102 receives power, e.g., from mains, and wirelessly transmits power through structure 104 into charging space 101 using, e.g., a transmitting coil 108 $L_{TX}$ (shown in FIG. 3). Receiver 106 wirelessly receives power from sub-surface wireless charger 102 and uses such received power to, e.g., operate receiver 106, charge a battery (not shown) coupled to receiver 106, and/or retransmit power (e.g., wirelessly), e.g., to another device (not shown).

The intensity of the power received by receiver 106 from sub-surface wireless charger 102 may depend, in part, on the distance between receiver 106 and sub-surface wireless charger 102 (e.g., based on the distance from a center of a transmitting coil of sub-surface wireless charger 102 to a center of a receiving coil of receiver 106). For example, generally, the closer the center of the receiving coil of receiver 106 is to the center of the transmitting coil of sub-surface wireless charger 102, the higher the intensity of wireless power received by receiver 106 from sub-surface wireless charger 102.

Structure 104 may be, for example, a table, a wall, or another surface. Although structure 104 is illustrated as a planar horizontal surface, it is understood that structure 104 may be a vertical structure, such as a wall, or an inclined structure. In some embodiments, structure 104 may not be planar.

In some embodiments, structure 104 may be made of wood, ceramic, plastic, and/or other non-conductive materials, for example. In some embodiments, structure 104 may have a thickness $d_1$ of, e.g., between 20 mm and 30 mm, such as, e.g., 20 mm or 25 mm. In some embodiments, thickness $d_1$ may be thicker than 30 mm. In other embodiments, thickness $d_1$ may be thinner than 20 mm, such as 18 mm, 15 mm, 10 mm or thinner.

Receiver 106 may be, for example, a smartphone, a tablet, a laptop, a wearable, a power tool, or another battery operated portable device capable of wirelessly receiving power. Other devices are also possible. For example, in some embodiments, receiver 106 may not include a battery. In some embodiments, receiver 106 may be configured to operate only when wirelessly receiving power. In some embodiments, receiver 106 may not be a portable device. For example, receiver 106 may be attached to top surface 104a. For example, in some embodiments, receiver 106 may be a thermostat to control a heating, ventilation, and air conditioning (HVAC) of a house, and structure 104 may be a vertical wall, where sub-surface wireless charger 102 is attached to the inside surface of the wall and the thermostat is attached to the outside surface of the wall.

In some embodiments, sub-surface wireless charger 102 may be capable of transferring 10 W of wireless power to receiver 106. In some embodiments, sub-surface wireless charger 102 may be capable of transferring more than 10 W of wireless power to receiver 106, such as 15 W, 45 W, or more. In other embodiments, the maximum power that sub-surface wireless charger 102 is capable of transferring to receiver 106 may be lower than 10 W, such as 5 W or less.

In some embodiments, sub-surface wireless charger 102 may be implemented, e.g., as wireless charger transmitter 12. In some embodiments, receiver 106 may be implemented as wireless power receiver 14.

In some sub-surface wireless charging systems, such as in sub-surface wireless charging system 100, the coupling coefficient between the transmitting coil of the sub-surface wireless charger and the receiving coil of the receiver is generally low. For example, FIG. 3 shows transmitting coil $L_{TX}$ 108 of sub-surface wireless charger 102 and receiving coil $L_{RX}$ 110 of receiver 106 having their respective coil centers aligned with centerline 112, according to an embodiment of the present invention.

Transmitting coil $L_{TX}$ 108 may be implemented, for example, using Litz wire. Other implementations are also possible.

Receiving coil 106 may be implemented, for example, using traces in a printed circuit board (PCB). Other implementations, such as using stamped metal, or Litz wires may also be used.

In some embodiments, the coupling coefficient between transmitting coil $L_{TX}$ 108 and receiving coil $L_{RX}$ 110 when the centers of transmitting coil $L_{TX}$ 108 and receiving coil $L_{RX}$ 110 are aligned with centerline 112 and when thickness $d_1$ is 20 mm may be, e.g., about 0.1. In some embodiments, centerline 112 is orthogonal to the winding loops of transmitting coil 112.

In some embodiments, the coupling coefficient may be maximized when the centers of transmitting coil $L_{RX}$ 108 and receiving coil $L_{RX}$ 110 are aligned with centerline 112. Less than perfect alignment (e.g., when the coil centers of transmitting coil $L_{RX}$ 108 and receiving coil $L_{RX}$ 110 are misaligned) causes the coupling coefficient to be lower, thereby reducing the efficiency of the wireless power transfer as well as the maximum amount of power that can be transferred by sub-surface wireless charger 102 into receiver 106.

In some embodiments, sub-surface wireless charger 102 does not move with respect to structure 104 during normal operation. For example, in some embodiments, sub-surface wireless charger 102 is firmly attached (e.g., using glue) to bottom surface 104b of structure 104.

In some embodiments, to maximize the coupling coefficient between sub-surface wireless charger 102 and receiver 106, a mark may be placed in top surface 104a that coincides with centerline 112. A user then is able to place receiver 106 so that the center of receiving coil $L_{RX}$ 110 is aligned with transmitting coil $L_{TX}$ 108.

Figure 4:
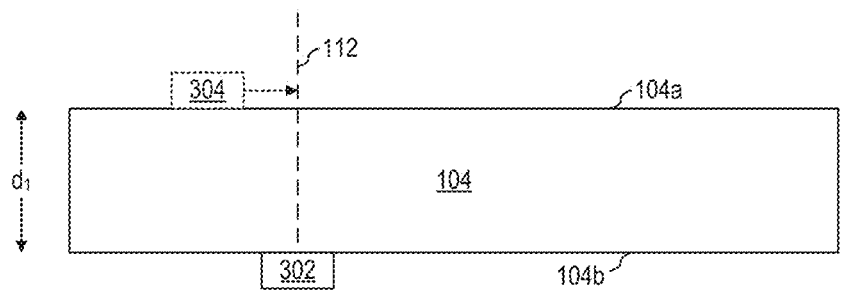
FIG. 4 illustrates a method of identifying a wireless charging centerline by using first and second magnets, according to an embodiment of the present invention.

In an embodiment, during installation of sub-surface wireless charger 102 in bottom surface 104b, transmitter magnet 302 is firmly placed at bottom surface 104b, in the location where transmitting coil $L_{TX}$ 108 is to be positioned (e.g., where a center of transmitting coil $L_{TX}$ 108 is to be positioned), as shown in FIG. 4. A receiver magnet 304 is placed at top surface 104a near the location where centerline 112 will be. A magnetic force generated between magnets 302 and 304 will push receiver magnet 304 to the point of minimum distance between magnets 302 and 304 (where the attraction force is the highest), which is where centerline 112 will be. Once receiver magnet 304 comes to a resting position (stops moving), a mark is placed at top surface 104a, which corresponds to where centerline 112 will be.

The installer may place the mark in top surface 104a using, e.g., a pencil, sticker, or other marking device (e.g., such as a drill, knife, etc.). In some embodiments, magnet 304 has a (e.g., center) hole to facilitate marking without removing magnet 304 from its resting position.

Once the location of centerline 112 is identified using magnets 302 and 304, sub-surface wireless charger 102 is installed (e.g., firmly attached to bottom surface 104b) at the location where the center of transmitter magnet 302 was located during the alignment process.

Transmitter magnet 302 and receiver magnet 304 may be implemented with any type of magnet with sufficient magnetic strength so that they can attract each other at a distance of at least $d_1$.

Advantages of some embodiments include reduced complexity and/or cost for aligning the receiver with the sub-surface wireless charger when compared with, e.g., active alignment methods.

Figure 5:
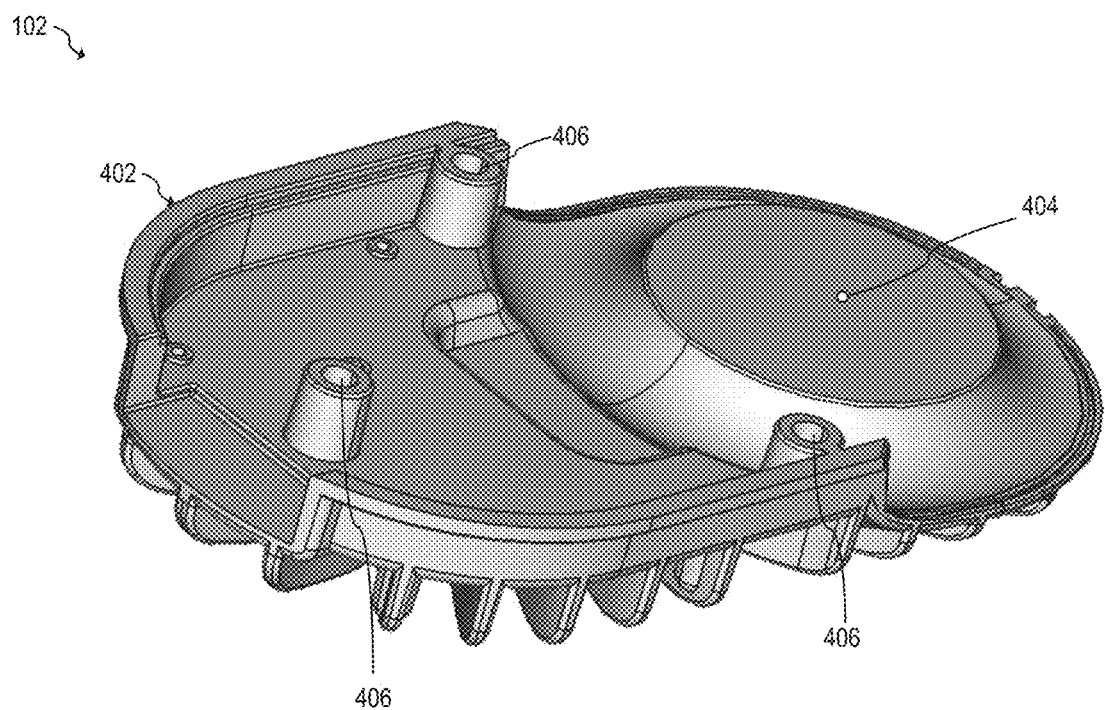
FIG. 5 shows a perspective view of an enclosure of the sub-surface wireless charger of FIG. 2, according to an embodiment of the present invention.

FIG. 5 shows a perspective view of enclosure 402 of sub-surface wireless charger 102, according to an embodiment of the present invention. As shown in FIG. 5, enclosure 402 includes a plurality of screw holes 406 to be used for attaching sub-surface wireless charger 102 into bottom surface 104b. Location 404 indicates the center of transmitting coil $L_{TX}$ 108. It is understood that enclosure 402 is a non-limiting example, and that enclosure with different shapes, dimensions, coil location(s), screw hole location(s) may also be used. For example, in some embodiments, enclosure 402 may not include any screw holes (e.g., may be attached to surface 104 in other ways, such as, e.g., using glue).

Figure 6A:
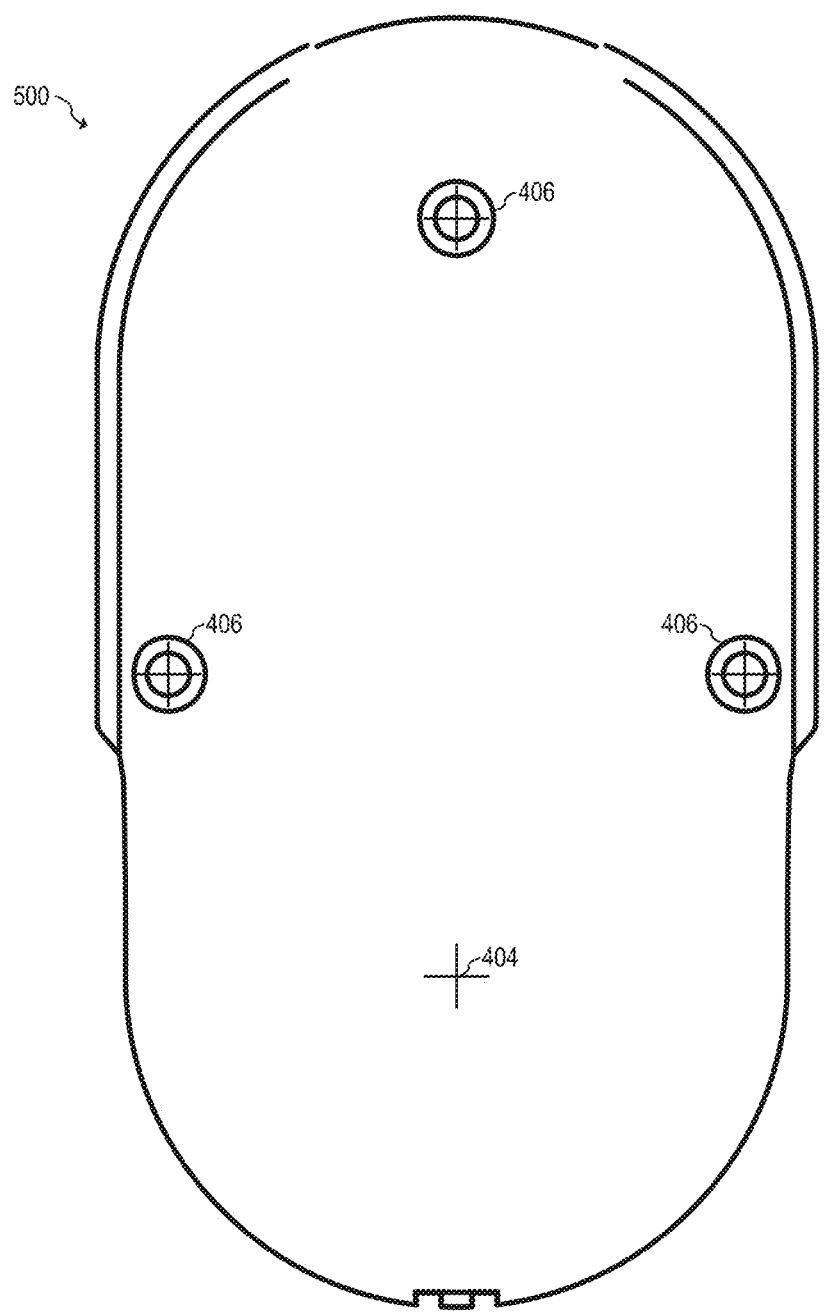
FIGS. 6A and 6B show wireless charging transmitter templates, according to embodiments of the present invention.

In an embodiment, a wireless charging transmitter template may be used during the alignment process. For example, FIG. 6A shows wireless charging transmitter template 500, according to an embodiment of the present invention. It is understood that template 500 is a non-limiting example, and that other dimensions, screw hole locations, and mark 404 location are also possible (e.g., depending on the design of the particular sub-surface wireless power transmitter enclosure used).

As shown in FIG. 6A, template 500 shows the contour of enclosure 402 and includes marks for the location of screw holes 406 and for location 404.

Template 500 may be implemented with paper, plastic, solid plastic, or other suitable material. In some embodiments, template 500 may be a detachable portion of enclosure 402. In some embodiments, template 500 has a top side with adhesive properties.

During the installation of sub-surface wireless charger 102, template 50o is attached to bottom surface 104b so that marks 404 and 406 are visible to the installer. After template 500 is attached to bottom surface 104b, magnet 302 is placed at location 404 (e.g., with a center of magnet 302 coinciding with a center of mark 404) for performing the alignment process. Once the alignment process is complete, the installer may use marks 404 of template to mount sub-surface wireless charger 102 into bottom surface 104b so that centerline 112 is aligned with the mark placed by the installer in top surface 104a (based on the resting position of receiver magnet 304).

Figure 6B:
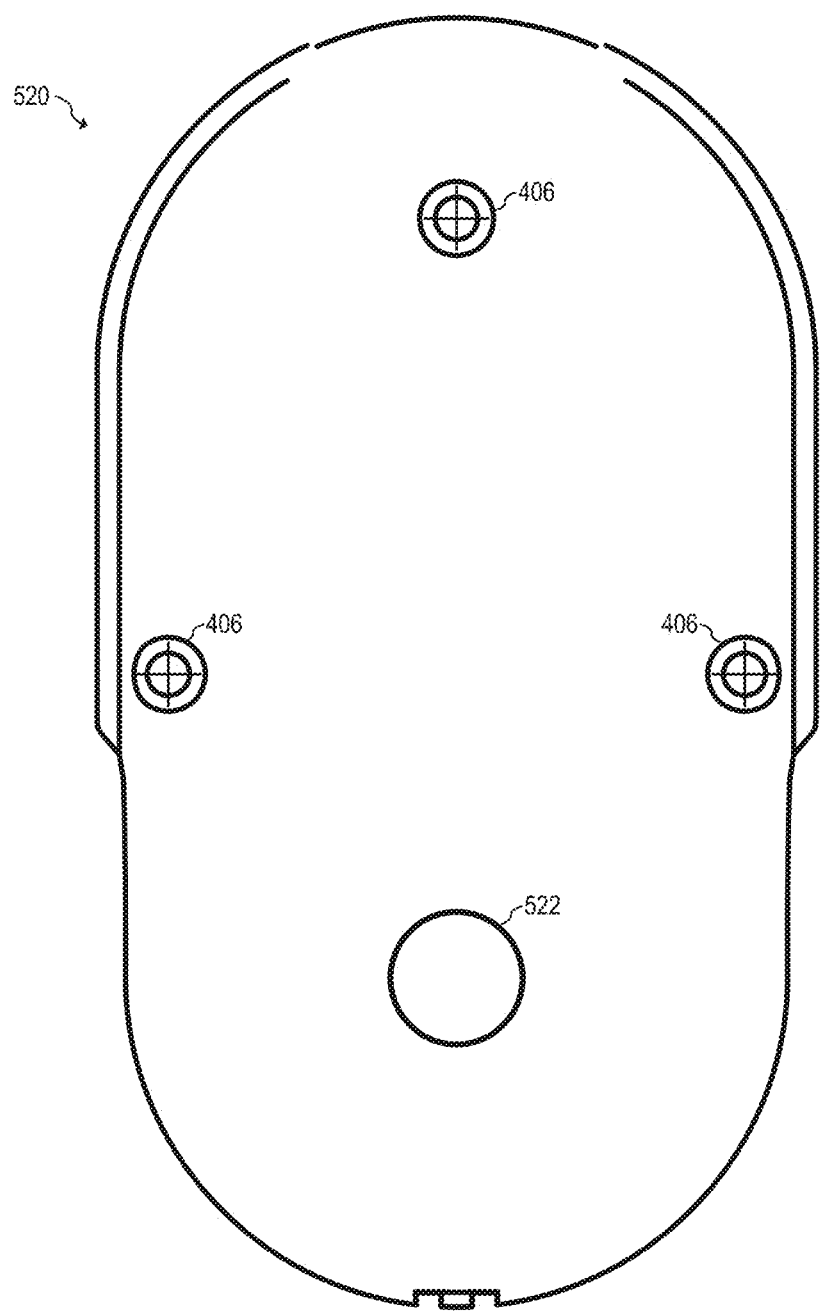

In some embodiments, template 500 may be implemented with the top cover of sub-surface wireless charger 102, which may be detachable. In some embodiments, template 500 may, e.g., have a small groove (or a hole) to allow for precise placement of magnet 302. For example, FIG. 6B shows wireless charging transmitter template 520, according to an embodiment of the present invention. Template 520 includes hole or groove 522. Template 520 may also serve as the cap of enclosure 402. For example, template 520 may be implemented with plastic, metal, and/or with the same material as enclosure 402. Other suitable materials can also be used.

Template 520 may be attached to enclosure 402, e.g., using one or more screw holes 406. Template 520 may also attach to bottom surface 104b, e.g., using one or more screw holes 406. Hole or groove 522 may have a shape following the contour of magnet 302 so that magnet 302 can be placed, e.g., at location 404 with a tight tolerance (e.g., +/−1 mm).

In some embodiments, such as in some embodiments that include hole or groove 522, the step of placing a mark at location 404 may be omitted.

In some embodiments in which the top cover of sub-surface wireless charger 102 is detachable and has a hole, a piece of plastic may be permanently attached to the transmitting coil $L_{TX}$ 108 in the area where the hole is, e.g., which may advantageously result in sub-surface wireless charger 102 having a uniform surface and look when assembled.

Figure 7:
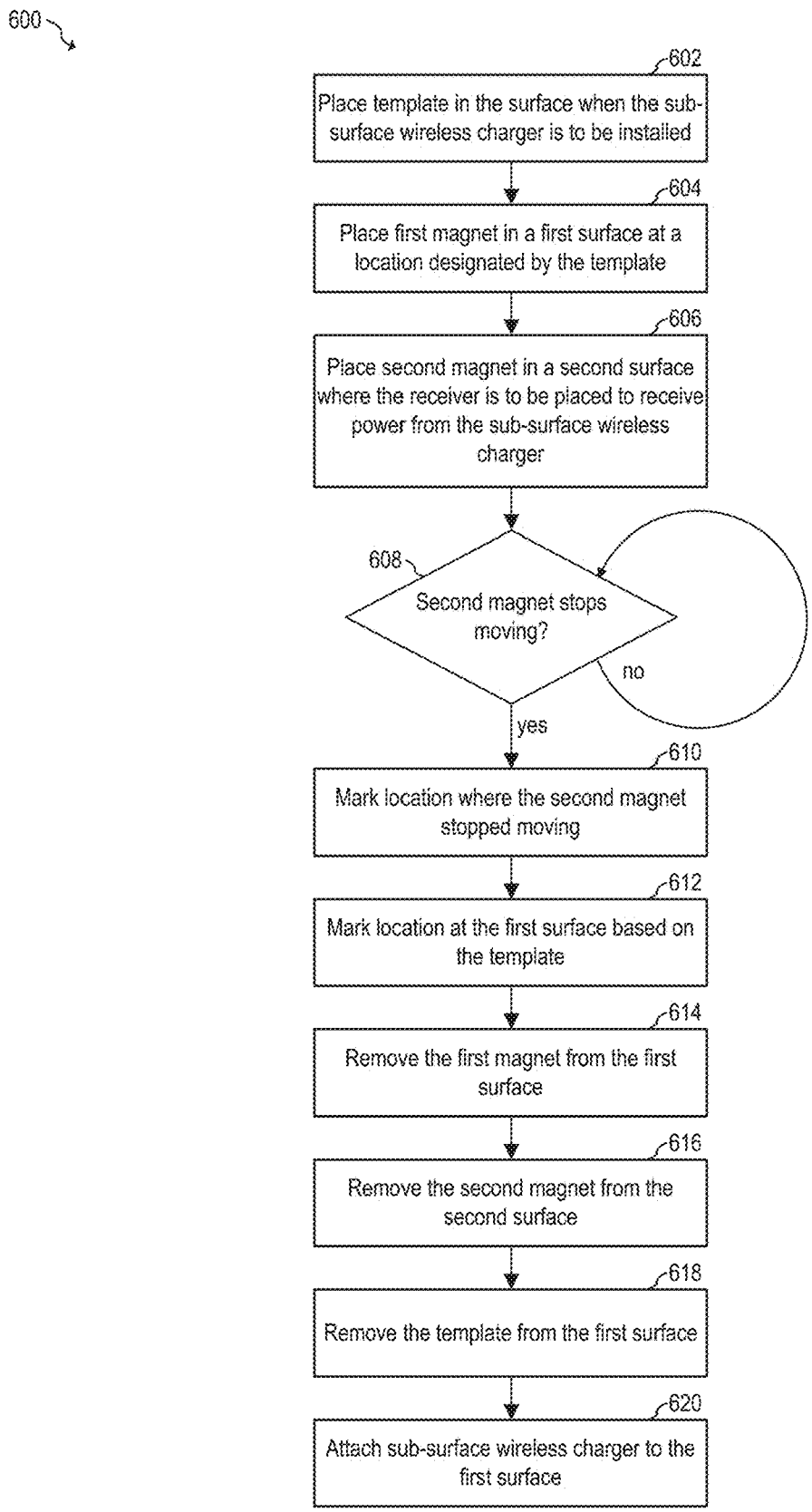
FIGS. 7 and 8 show flow charts of embodiment methods for installing a sub-surface wireless charger using magnets, according to embodiments of the present invention.

FIG. 7 shows a flow chart of embodiment method 600 for installing a sub-surface wireless charger using magnets, according to an embodiment of the present invention.

During step 602, an installer (e.g., a human) places the template (e.g., 500) in a first surface (e.g., 104b) of a structure (e.g., 104) where the sub-surface wireless charger (e.g., 102) is to be installed.

During step 604, the installer places a first magnet (e.g., 302) at a location of the first surface designated by the template (e.g., location 404). In some embodiments, the location coincides with the center of the transmitting coil $L_{TX}$ (e.g., 108) of the sub-surface wireless charger. In other embodiments, the location may not coincide with the center of the transmitting coil.

During step 606, the installer places a second magnet (e.g., 304) at a second surface (e.g., 104a) where the receiver (e.g., 106) is to be placed to receive power from the sub-surface wireless charger. During step 606, the magnet is placed at a location near the first magnet so that the attracting magnetic force between the first and second magnets is sufficient to move the second magnet.

During step 608, the installer waits for the second magnet to stop moving. Once the second magnet stops moving, the installer marks the location where the magnet stopped moving during step 610. In some embodiments, the installer marks a location that is referenced to the location where the magnet stopped moving, but that is different from such location.

During 612, the installer marks one or more locations (e.g., 406) in the first surface using the template to use as a reference for installing the sub-surface wireless charger. In some embodiments, the installer may place the mark of the one or more locations during step 612 using, e.g., a pencil, sticker, and/or other marking device (e.g., such as a drill, knife, etc.). In some embodiments, step 612 may be performed before step 604.

During steps 614 and 616, the first and second magnets are removed. During step 618, the template is removed from the first surface. In some embodiments, e.g., where the top cover of the sub-surface wireless charger is used as the template, step 618 may be skipped.

During step 620, the sub-surface wireless charger is attached to the first surface, e.g., using the marks made during step 612. In some embodiments, such as where the top cover of the sub-surface wireless charger is used as the template, attaching the sub-surface wireless charger to the first surface involves attaching the sub-surface wireless charger to the detachable template (e.g., without using any marks as a reference). In such embodiments, step 612 may be skipped.

Once installed, a user may place the receiver at a location based on the mark (e.g., on top of the mark) generated during step 610 so that the receiving coil is aligned with the transmitting coil.

In some embodiments, sub-surface wireless charger 102, template 500, and magnets 302 and 304 are delivered to the installer, e.g., as an assembly kit, e.g., in a box, before performing step 602.

It is understood that some of the steps of method 600 may be implemented in a different order. For example, step 612 may be performed any time after step 602 and before step 618.

It is also understood that the installer may be a single human, a plurality of humans, a machine, a plurality of machines, or a combination of one or more humans and one or more machines.

Figure 8:
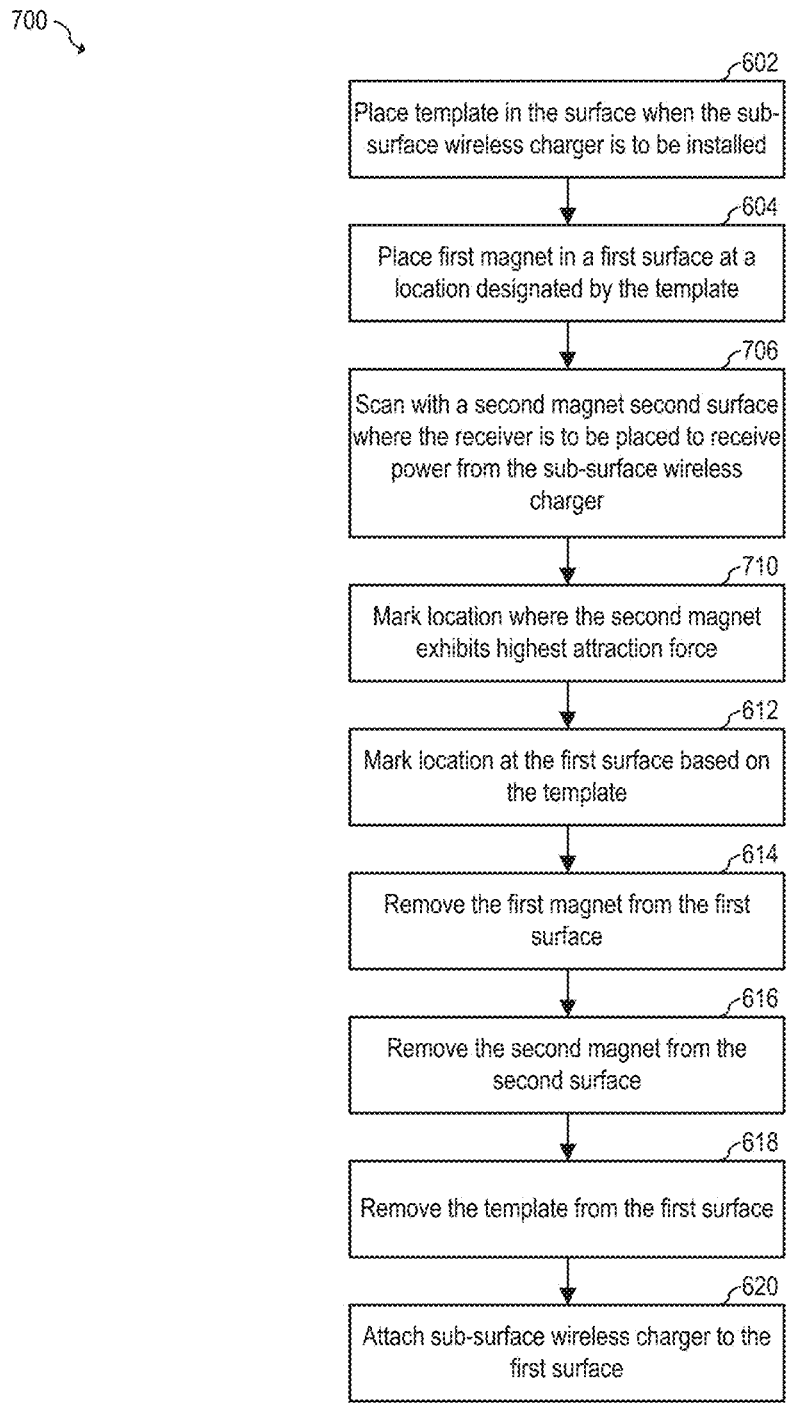

FIG. 8 shows a flow chart of embodiment method 700 for installing a sub-surface wireless charger using magnets, according to an embodiment of the present invention. As shown in FIG. 8, method 700 includes steps 602, 604, 706, 710, 612, 613, 616, 618, and 620. Steps 602, 604, 612, 613, 616, 618, and 620 may be performed in a similar manner as described with respect to method 600.

During step 706, the installer scans the second surface (e.g., 104*a*) with the second magnet (e.g., 304). For example, the installer places the second magnet in contact with the second surface and moves the second magnet around the second surface.

During step 710, the installer determines the location of the second surface in which the second magnet exhibits the highest attraction force to the second surface and marks such location in a similar manner as in step 610.

Figure 9:
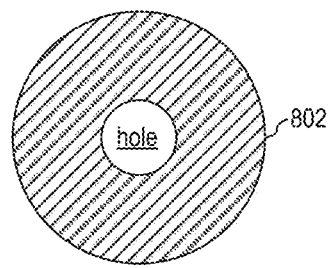
FIG. 9 shows various views of magnet 802, according to an embodiment of the present invention.
Figure 9:
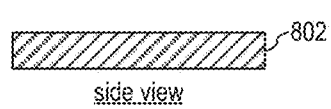

FIG. 9 shows various views of magnet 802, according to an embodiment of the present invention. Magnet 302 and/or 304 may be implemented as magnet 802. As shown in FIG. 9, magnet 802 has a hole at the center of magnet 802. In some embodiments, the hole at the center of magnet 802 may be used to mark surface 104, e.g., by using operating a marking device (e.g., a pencil, pointed object, etc.) through the hole of magnet 802.

In some embodiments, magnet 802 may have a circular shape (e.g., as shown in FIG. 9). In some embodiments, other shapes (e.g., square, rectangular, oval, or arbitrary shape) may also be used.

Example embodiments of the present invention are summarized here. Other embodiments can also be understood from the entirety of the specification and the claims filed herein.

Example 1. A method including: placing a template at a first surface of a structure; placing a first magnet at the first surface based on the template; placing a second magnet at a second surface of the structure at a first location in which a magnetic field between the first and second magnets moves the second magnet towards the first magnet; waiting for the second magnet to stop moving at a second location of the second surface; marking the second location; and attaching a sub-surface wireless charger based on a location of the template.

Example 2. The method of example 1, where placing the first magnet at the first surface includes placing the first magnet in a groove of the template.

Example 3. The method of one of examples 1 or 2, where placing the first magnet at the first surface includes placing the first magnet in a hole of the template.

Example 4. The method of one of examples 1 to 3, where the second magnet includes a hole, and where marking the second location includes drawing a mark at the second surface through the hole of the second magnet.

Example 5. The method of one of examples 1 to 4, where attaching the sub-surface wireless charger based on the location of the template includes attaching the sub-surface wireless charger to the template.

Example 6. The method of one of examples 1 to 5, where the template includes plastic.

Example 7. The method of one of examples 1 to 6, where the template includes paper.

Example 8. The method of one of examples 1 to 7, further including placing a receiver on top of a mark of the second location so that a receiving coil receives wireless power from a transmitting coil of the sub-surface wireless charger.

Example 9. The method of one of examples 1 to 8, where the structure includes wood, ceramic, or plastic.

Example 10. The method of one of examples 1 to 9, where the first surface is a planar surface.

Example 11. The method of one of examples 1 to 10, where the structure includes a vertical wall.

Example 12. The method of one of examples 1 to 11, where the second surface is opposite the first surface.

Example 13. The method of one of examples 1 to 12, where placing the template at the first surface includes attaching the template to the first surface with screws.

Example 14. The method of one of examples 1 to 13, further including scanning with the second surface with the second magnet before placing the second magnet at the first location.

Example 15. The method of one of examples 1 to 14, further including delivering the sub-surface wireless charger and the first and second magnet to a user before placing the template at the first surface of the structure.

Example 16. The method of one of examples 1 to 15, where an orthogonal distance between the first surface and the second surface is greater than or equal to 20 mm and shorter than or equal to 30 mm.

Example 17. The method of one of examples 1 to 16, where the structure is a tabletop of a table.

Example 18. An assembly kit including: a first magnet; a second magnet; a template; and a sub-surface wireless charger, where the assembly kit is to be assembled based on the method of one of examples 1 to 17.

Example 19. A method including: placing a detachable template at a first surface of a structure; placing a first magnet at the first surface based on the detachable template; placing a second magnet at a second surface of the structure at a first location in which a magnetic field between the first and second magnets pushes the second magnet towards the first magnet; when the second magnet is at a resting position in a second location of the second surface, marking the second surface of the structure based on the second location; and attaching a sub-surface wireless charger to the detachable template.

Example 20. A method including: placing a template at a first surface of a structure; placing a first magnet in the template; placing a second magnet at a second surface of the structure at a first location in which a magnetic field between the first and second magnets pushes the second magnet towards the first magnet; when the second magnet is at a resting position at a second location, marking the second surface of the structure based on the second location; and attaching a sub-surface wireless charger to the first surface of the structure.

Example 21. The method of example 20, where the sub-surface wireless charger includes a transmitting coil having a center point, and where a centerline that is orthogonal to the first surface and to the transmitting coil crosses the center point of the transmitting coil and the marking of the second surface.

Example 22. The method of one of examples 20 or 21, where the sub-surface wireless charger includes an enclosure having a plurality of screw holes, and where the template includes a line following a contour of the enclosure.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
   placing a template at a first surface of a structure;
   placing a first magnet at the first surface based on the template;
   scanning a second surface of the structure with a second magnet;
   marking a second location where the second magnet exhibits a highest attraction force, the second location being a location at the second surface of the structure; and
   attaching a sub-surface wireless charger based on a location of the template.

2. The method of claim 1, wherein placing the first magnet at the first surface comprises placing the first magnet in a groove of the template.

3. The method of claim 1, wherein placing the first magnet at the first surface comprises placing the first magnet in a hole of the template.

4. The method of claim 1, wherein the second magnet comprises a hole, and wherein marking the second location comprises drawing a mark at the second surface through the hole of the second magnet.

5. The method of claim 1, wherein attaching the sub-surface wireless charger based on the location of the template comprises attaching the sub-surface wireless charger to the template.

6. The method of claim 1, wherein the template comprises plastic.

7. The method of claim 1, wherein the template comprises paper.

8. The method of claim 1, further comprising placing a receiver on top of a mark of the second location so that a receiving coil receives wireless power from a transmitting coil of the sub-surface wireless charger.

9. The method of claim 1, wherein the structure comprises wood, ceramic, or plastic.

10. The method of claim 1, wherein the first surface is a planar surface.

11. The method of claim 1, wherein the structure comprises a vertical wall.

12. The method of claim 1, wherein the second surface is opposite the first surface.

13. The method of claim 1, wherein placing the template at the first surface comprises attaching the template to the first surface with screws.

14. The method of claim 1, further comprising delivering the sub-surface wireless charger and the first and second magnet to a user before placing the template at the first surface of the structure.

15. The method of claim 1, wherein an orthogonal distance between the first surface and the second surface is greater than or equal to 20 mm and shorter than or equal to 30 mm.

16. The method of claim 1, wherein the structure is a tabletop of a table.

17. An assembly kit comprising:
    the first magnet;
    the second magnet;
    the template; and
    the sub-surface wireless charger, wherein the assembly kit is to be assembled based on the method of claim 1.

18. A method comprising:
    placing a template at a first surface of a structure;
    placing a first magnet at the first surface, the first magnet coinciding with a center point of a transmitting coil of a sub-surface wireless charger to be installed where the template is located;
    scanning a second surface of the structure with a second magnet in order to evaluate a magnetic attraction force provided by the first magnet;
    marking a location at the second surface where the second magnet exhibits a highest attraction force; and
    attaching the sub-surface wireless charger based on a location of the template.

19. The method of claim 18, wherein the sub-surface wireless charger includes an enclosure having a plurality of screw holes, and wherein the template comprises a line following a contour of the enclosure.

20. A method comprising:
    placing a template at a first surface of a structure;
    placing a first magnet at the first surface based on the template;
    scanning a second surface of the structure with a second magnet in order to evaluate a magnetic attraction force provided by the first magnet;

marking a location at the second surface where the second magnet exhibits a highest attraction force; and attaching a sub-surface wireless charger based on a location of the template.

21. The method of claim 20, wherein scanning the second surface comprising moving around, by an installer, the second magnet.

22. The method of claim 18, wherein attaching the sub-surface wireless charger comprises attaching the sub-surface wireless charger so that a centerline of the center point is orthogonal to the first surface and to the transmitting coil and so that the centerline crosses the center point and the marking of the second surface.

\* \* \* \* \*